Jan. 30, 1934.          W. W. PAGON          1,945,229
CONVERTING APPARATUS
Original Filed Aug. 30, 1928     7 Sheets-Sheet 1

Jan. 30, 1934. W. W. PAGON 1,945,229
CONVERTING APPARATUS
Original Filed Aug. 30, 1928 7 Sheets-Sheet 3

Jan. 30, 1934.  W. W. PAGON  1,945,229
CONVERTING APPARATUS

Original Filed Aug. 30, 1928   7 Sheets-Sheet 5

Inventor
W. W. PAGON

By Semmes & Semmes
Attorneys

Jan. 30, 1934.  W. W. PAGON  1,945,229
CONVERTING APPARATUS
Original Filed Aug. 30, 1928   7 Sheets-Sheet 6

Inventor
W. W. PAGON
By Semmes & Semmes
Attorneys

Jan. 30, 1934.     W. W. PAGON     1,945,229
CONVERTING APPARATUS
Original Filed Aug. 30, 1928     7 Sheets-Sheet 7

Inventor
W. W. PAGON
By Semmes & Semmes
Attorneys

Patented Jan. 30, 1934

1,945,229

UNITED STATES PATENT OFFICE 1,945,229

CONVERTING APPARATUS

William Watters Pagon, Baltimore, Md., assignor, by mesne assignments, to The Oberphos Company, Baltimore, Md., a corporation of Maryland Application August 30, 1928, Serial No. 303,086
Renewed June 21, 1932

11 Claims. (Cl. 71—1)

This invention relates to the preparation of fertilizers and pertains more specifically to an apparatus for converting agriculturally unavailable nitrogenous material to an available form.

In the past there have been proposed many specific methods for converting nitrogenous materials into fertilizer. These methods comprehended generally the idea of digesting the material either with live steam or with an acid. The apparatus employed to effectuate these processes have comprised essentially only a conventional digester, either provided with an acid resistant lining or not, depending upon the digesting agent employed.

The present invention relates to an apparatus for rendering such materials available by converting the material while subjected to heat and pressure and without the use of extraneous digesting agents.

The present invention contemplates the treatment of agriculturally unavailable nitrogenous material, such as feathers, hair, wool, leather and other similar substances, to convert the same into a material in which the nitrogen will be agriculturally available. It has been found that the present invention is of particular advantage in treating leather to convert the nitrogen therein into an agriculturally available form.

It is an object of this invention to provide an apparatus of the class described in which the material may be uniformly heated under any desired degree of pressure.

It is another object of the invention to provide an apparatus in which the material may be converted and cooled or dried in substantially one step and in a single element.

Another object of the invention is to provide an apparatus of the class described in which the volatile products of reaction may be recovered.

Another object is to provide an apparatus in which the material may be uniformly heated and in which the temperature of reaction may be accurately controlled.

With these and other equally important objects in view, the invention comprehends the provision of means for accomplishing thermal conversion or decomposition of unavailable nitrogenous material into an available form.

The apparatus comprises broadly one or more autoclaves operatively associated with a heating means and recovery system whereby the material to be treated may be subjected to the action of hot gases which are circulated throughout the material. The material preferably is so mounted in the treating apparatus as to provide a substantial nterstitial structure and to thereby permit facile circulation of the heating fluid.

In order to enable a ready understanding of the invention, there is shown in the accompanying drawings preferred modifications. In these the same reference numerals refer to similar parts throughout the several views, of which.

Figures 1, 15:
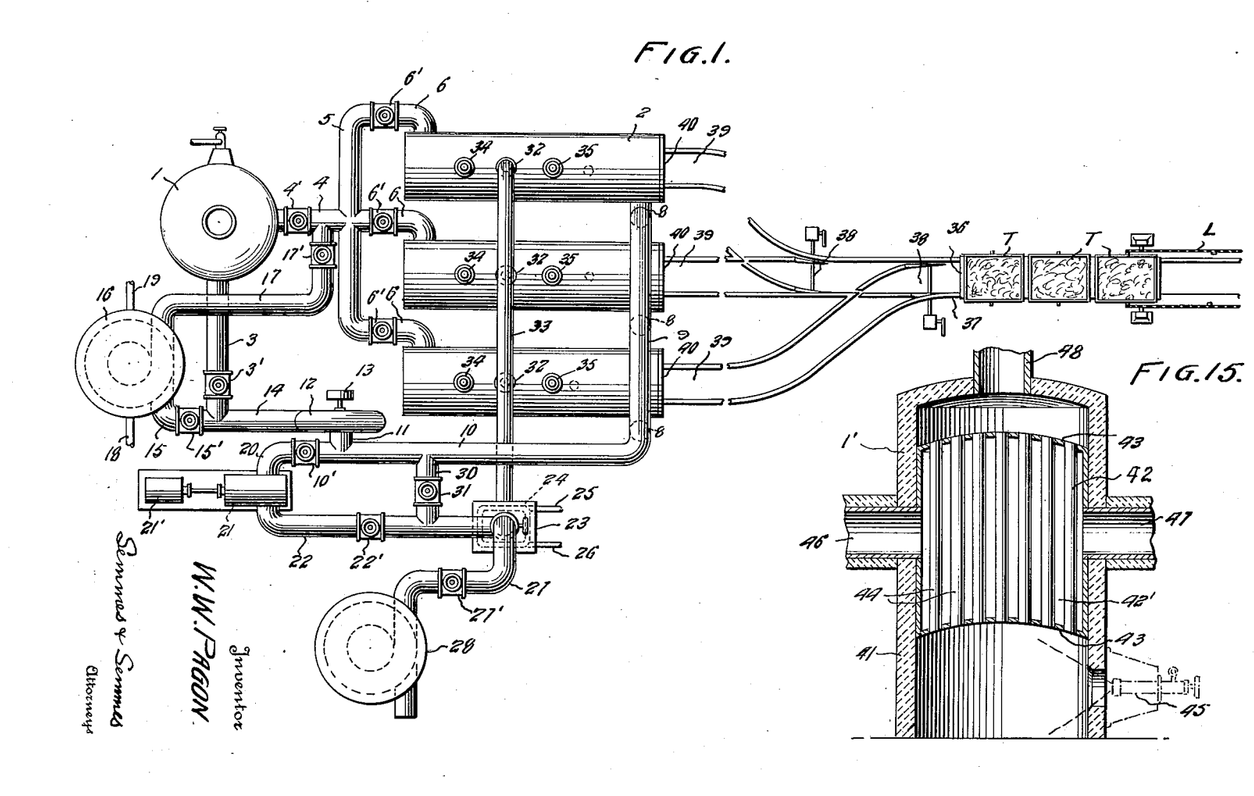
Figure 1 is a plan view of an installation embodying the principles of the invention.
Fig. 15 is a vertical sectional view of a furnace similar to that shown in Fig. 1.
Figure 2:
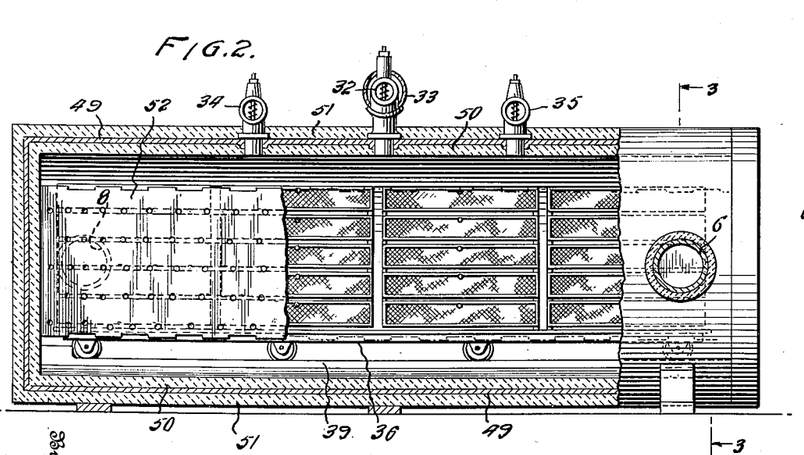
Fig. 2 is a partial sectional view of one of the autoclaves shown in Fig. 1.

As shown in Fig. 1, the system comprehends a furnace 1 cyclicly connected to a battery or plurality of autoclaves 2. A circulatory conduit may be established by connecting a fluid inlet line 3 to the lower or cooler portion of the furnace and a discharge line 4 to the upper or exit portion. The discharge line 4 is suitably connected to a header 5 from which lead branch lines 6. The branch lines 6 are preferably connected to the autoclaves (as shown in Fig. 2, at the median portion and adjacent one end. Secured to the shell of the autoclave preferably on the opposite side to the line 6 and at the other end is a fluid discharge line 8. This line may be connected to a common header 9 which, as shown, is extended to connect with the line 10.

In fluid connection with the draw off line 10, as by a suitable T connection 11, is a blower, pump or fan 12. The blower may be provided with any suitable driving mechanism exemplified in the drawings by the electric motor 13. On the blower, in communication with its discharge duct, is a return line 14. This line communicates with the inlet line 3 and, through a branch 15, with a condenser 16. From the condenser the fluid conduit extends, as by the pipe 17, to the discharge line 4.

The lines 3, 4, 6, 8, 10, 15 and 17 are each provided with shut-off valves 3', 4', 6', 8', 10', 15' and 17', respectively. It will be seen that by closing the valves 10' and 15' and opening valves 3', 4', 6' and 8', a heating medium may be circulated through the furnace 1 and any desired part of the autoclaves 2 and then back to the furnace. In this manner a given quantity of the heating medium may be constantly or variably circulated through the apparatus.

This medium, because of its travel through the furnace, is raised in temperature and is then discharged into the manifold or header 5. Due to the forced draft set up by blower or pump 12, the hot fluid circulates over and through the material in the autoclaves (in a manner to be more particularly pointed out) and during this movement gives up much of its contained heat. On discharge from the autoclaves the heating medium is again forced, by the blower 12, through the furnace and is reheated and recycled through the autoclaves. The nitrogenous material within the autoclaves may, therefore, be subjected to any desired gradations of heat and by successive caloric increments uniformly attain the desired conversion temperature without any danger of local overheating.

As has been indicated hereinbefore, the present invention relates to the thermal decomposition of nitrogenous materials. These materials are rendered available by heating to a conversion temperature under pressure. It will be appreciated from the preceding description that as the heating treatment progresses an autogenous pressure is built up. As the nitrogenous materials are heated, certain volatiles may be evolved, which will increase the pressure within the closed system. It is to be understood, however, that it is within the scope of the invention to force the heating medium through the autoclave initially under any desired pressure, positive or negative. The heating medium may be admitted to the closed cycle through a feed line connected to a high pressure pump.

Many fluids may be used as the treating or heating media, the particular fluid selected, of course depends on the particular type of reaction to be carried out in the autoclaves. Some fluids such as air, air with its oxygen content removed, flue gases, inert gases, steam, active gases, gases or vapors evolved from the material undergoing treatment or liquids can be advantageously utilized.

In some instances it is desirable to speed up the reaction or to modify the product. This can be accomplished by the introduction of acids or other reactive or catalytic material into the process.

It is likewise within the scope of the invention to remove from the cyclic stream condensible vapors which may be evolved during the heating or conversion of the nitrogenous raw product. Upon an inspection of Fig. 1, it will be seen that this may be readily accomplished by closing valves 3' and 4' and opening valves 15' and 17'. Such manipulation of the valves will by-pass the stream through the condenser 16 and cut out the furnace 1. The condensation of condensible components of the mixture may be accomplished in the condenser 16.

It will be understood that the material passing to condenser 16 is cooled or condensed by a cooling medium which enters through pipe 18 and discharges through pipe 19. The cooling medium preferably is circulated in counter-current relation to the hot fluid mixture. From the condenser 16 the now condensed and available products may be drawn off either continuously or intermittently.

It can be readily seen that by connecting the condenser 16 in circuit with the autoclaves 2, and circulating the fluid contained in the autoclaves, condenser and conduits through the circuit, and utilizing the condenser as a cooling means, the material undergoing treatment in the autoclaves can be artifically cooled. Such an arrangement is particularly advantageous when it is desirable to accelerate the rate of cooling of the material being treated.

Provision is also made for heating the material by a once-through passage of the heating medium and also for blowing off the autoclaves after complete conversion, or any desired degree of conversion, has been attained. This may be accomplished by providing means, connected with the draw-off line 10, for withdrawing the fluid products from the closed cycle and passing them, preferably through an absorption tower, to a condenser and finally to a receiver or to the atmosphere.

As shown in Fig. 1, the valve 10' is connected at one end through a line 20 to a vacuum pump 21, which is driven by a suitable motor 21'. The discharge side of the vacuum pump communicates with the line 22 in which is interposed a shut-off valve 22'. The line 22 is extended and communicates with a suitable absorption tower 23. This absorption tower comprises nested shelves which provide enclosed heating spaces 24. In these heating spaces may be circulated a heating medium, such as steam, which may be admitted through the pipe 25 and discharged through pipe 26. In this absorption tower the noxious gases blown off from the autoclaves may be absorbed. From the container 23 overhead products, which are incondensible at the temperature of the tower, may be passed through line 27 to a final condenser 28. Interposed in this line is the valve 27' which is operable to cut the condenser in or out of the system. Connected between the lines 10 and 22 is a by-pass line 30 controlled by valve 31. Upon closing the valves 10' and 22' and opening valve 31, the hot products from the autoclave may be by-passed around the vacuum pump and passed directly into the absorption tower.

It is desirable to provide a means whereby the material within the autoclave may be blown off to the absorbing tank. This may readily be done by providing a blow-off valve 32 on each autoclave. Each of these valves is connected to the common discharge line 33 which, as shown, communicates with the absorption tower. It will be understood that these valves may be either manually or automatically operable upon the attainment of the predetermined pressure at which they are designed to function.

The digesters or autoclaves 2 are provided with automatic valves 34 adapted to operate to place the interior of the autoclaves in communication with the atmosphere whenever the pressure within the autoclaves falls below a predetermined point. Such valves are particularly advantageous when the material being treated is being subjected to a predetermined sub-atmospheric pressure and it is desirable to prevent the pressure getting below the predetermined point.

The valves 34 are also advantageous to prevent the formation of any undesirable excessive low pressure upon cooling the autoclaves and their contents prior to the removal of the contents therefrom.

The autoclaves 2 are also provided with safety valves 35 adapted to operate when a certain predetermined pressure is reached. These valves are provided primarily for the safe operation of the device and are intended to operate only when other means for the escape of the contents of the autoclaves 2 are not in operation.

When the apparatus embodying my invention is constructed on a large scale the problem of handling the material to be treated and packing it in the autoclaves arises. One means for solving this problem is shown somewhat diagrammatically in Fig. 1, in which a loading mechanism L is arranged to load trays T carrying the material to be treated onto a suitable car 36. The car 36 is mounted on a track 37 which may be connected by suitable switch devices 38 with other tracks 39 leading into the autoclaves 2. The loading mechanism will be described more in detail in connection with Figs. 7 to 11.

After the car 36 is loaded with a sufficient number of trays it is run into one of the autoclaves 2 through a suitable doorway provided in the end thereof. When the autoclave is sufficiently packed, the door 40 is closed, sealing the interior of the autoclave from the atmosphere, and the material packed in the autoclave is subjected to the treatment desired.

A furnace 1', similar to that indicated by the reference numeral 1 in Fig. 1, is shown somewhat diagrammatically in Fig. 15. The furnace 1' comprises a casing 41 in which is provided a heat exchange core 42. The core 42 consists of upper and lower tube sheets 43 provided with apertures adapted to receive tubes 44. The tubes are arranged vertically, and adapted to receive products of combustion from a burner 45. The space 42' between the tube sheets and around the tubes 44 is adapted to receive the fluid to be heated. Conduits 46 and 47 connect the heating chamber 42' of the furnace with conduits 3 and 4 of the circulating system shown in Fig. 1.

The furnace 1' is provided with a suitable duct or stack 48 adapted to pass the products of combustion flowing through the tubes 44 to a suitable point of disposal. The burner 45 may be supplied with any fuel suitable for the purpose of heating, and may be controlled by a thermostat operated by thermocouples, not shown, located in the chamber 42' between the tube sheets 43. If desired means for recording the temperatures of the furnace over a period of time may be provided. Means may also be provided for recording the pressure of the fluid in the system.

The furnace 1' may form the part of a different assembly, in which it is used as a means for transferring heat from waste, flue gases or other carriers of waste heat. In such an assembly the gaseous carrier of waste heat would be circulated through the space provided for the flow of products of combustion from the burner 45.

The autoclaves 2 are provided with vacuum release valves 34 and suitable safety valves 35, previously described. The autoclaves 2 are also provided with suitable blow-off valves 32 connected with the conduit 33 for conveying products released therefrom to the absorption tower 23.

Figure 3:
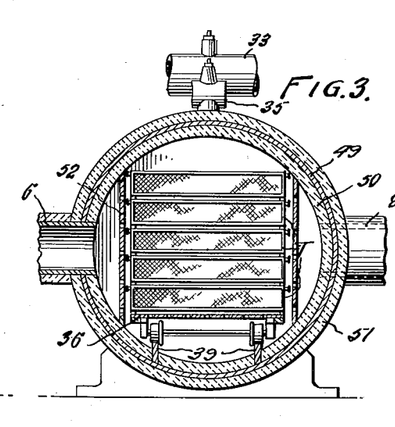
Fig. 3 is a cross section of the device shown in Fig. 2, taken on line 3—3 thereof.

The conduits 6 communicate with the interior of the autoclaves 2 in such a manner as to allow the fluid flowing therethrough to enter the autoclaves and flow over the material to be treated. Suitable perforated baffles 52 are arranged vertically within the autoclaves, as shown in Figs. 2 and 3.

The perforations in the baffles are more numerous at one end than at the other, and decrease in number progressively to the other end of the baffle. The ends of the baffles having the least number of openings per unit area are placed adjacent the inlet and outlet conduits.

In many instances it is desirable to place the baffles at a slight angle to provide a tapered space between the baffle and the side of the autoclave to insure a better distribution of the fluid flowing through the autoclave. These baffles act to distribute the fluid evenly over the material being treated, and thereby insure the production of a product uniformly treated.

The autoclaves are provided with continuations of the tracks 39, to provide a support for the cars 36 carrying the material to be treated.

Figures 4, 5, 6:
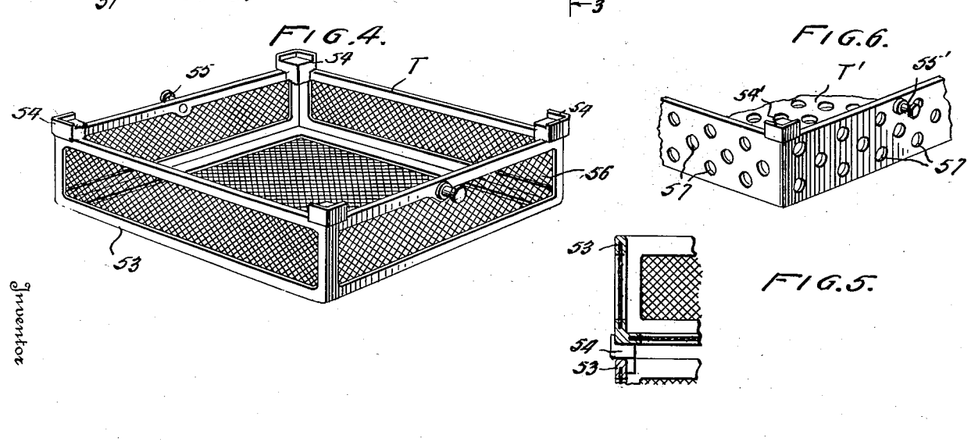
Fig. 4 is an enlarged detail of one form of container for the raw material.
Fig. 5 is a detail section of a portion of the container showing the method of stacking within the autoclave.
Fig. 6 is a fragmentary detail of a modified form of container.

Figure 4 shows a type of tray in which the material to be treated is packed and which is placed on the cars 36 to be run into the autoclaves 2, as shown in Figs. 2 and 3. These trays T consist of a frame member 53 provided with suitable stacking legs 54, adapted to cooperate with the frame of the tray above to permit easy stacking. The frame member 53 is also provided with suitable lugs 55 to provide a means for the handling of said trays by the conveyor, to be described later. The bottom and sides of the trays are formed of screen 56, or other material which will permit the flow of a fluid therethrough and yet retain solid material.

A somewhat detailed sectional view of several of the trays similar to those just described, is shown in Fig. 5, arranged in stack formation. It will be seen that the legs 54 are arranged to fit on the lower corners of the frame 53 in such a manner that many trays can be stacked one on top of the other without any danger of any of the trays slipping out of the stack.

A somewhat modified form of tray is shown in Fig. 6. In this form the tray T' comprises an open box-like member provided with suitable legs 54' and suitable lugs 55' to permit easy stacking and handling thereof. The tray shown in Fig. 6 differs from that previously described in that instead of being formed of a frame and screen the walls, bottom and frame of the tray are of the same material and are provided with perforations, as shown at 57.

When liquid substances such as undried blood are to be treated, modified types of trays are necessary, that is trays capable of retaining liquids. The trays suitable for retaining liquids are provided on the upper portions with stacking legs and handling lugs similar to those shown in Figs. 4 to 6.

Figures 7, 8, 9, 10, 11:
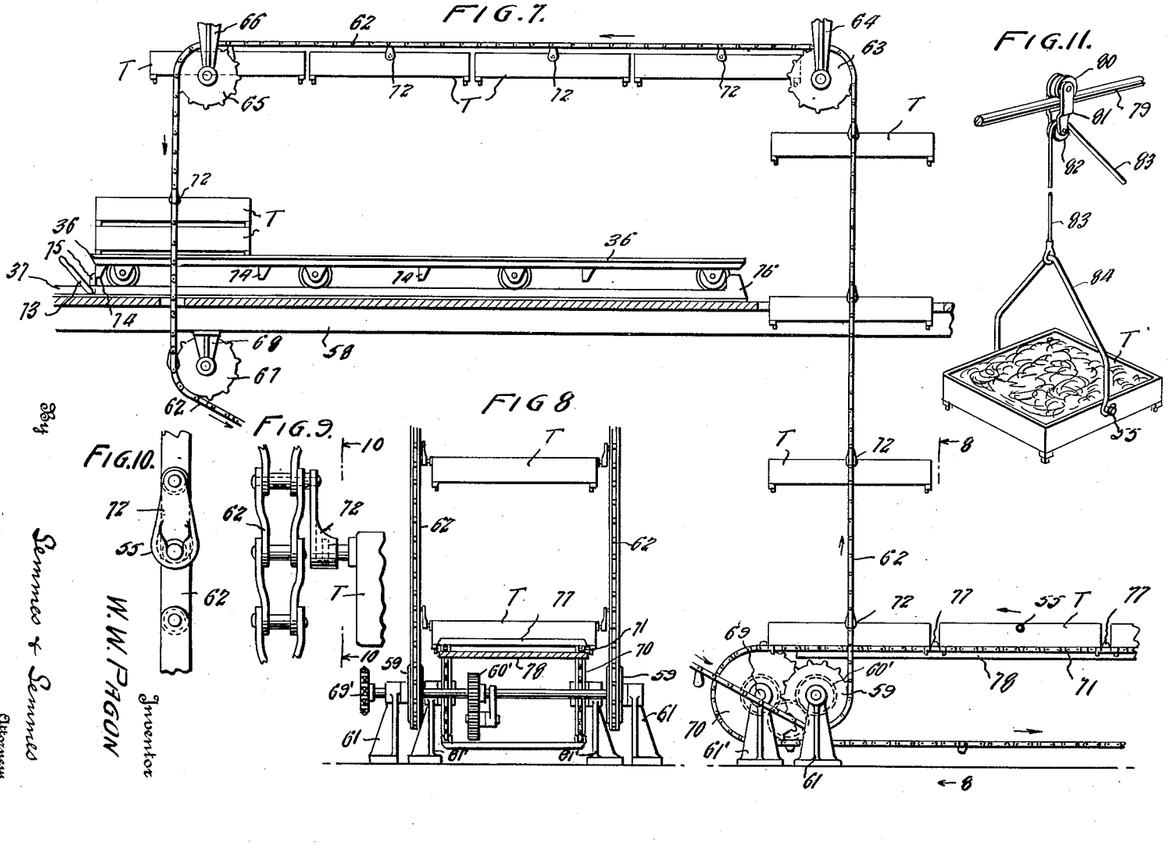
Fig. 7 is a diagrammatic representation of the method of loading the raw material into the autoclave.
Fig. 8 is a partial end elevation of the structure taken on line 8—8 of Fig. 7.
Fig. 9 is an enlarged detail of the endless chain conveyor.
Fig. 10 is a side view taken on line 10—10 of Fig. 9.
Fig. 11 is an enlarged detail of a modified form of loading mechanism.

The form of loading mechanism, indicated in Fig. 1 by L, is shown more in detail in Fig. 7, wherein a track 37 on which the car 36 is mounted, is supported on a suitable platform 58, at an elevation providing easy access to the autoclaves 2. The track is provided with a suitable stop 76 to prevent the car running into the conveyor. Sprocket wheels 59 are supported on the shaft 60 carried by trunnions 61 mounted on the storage floor of the plant or unloading platform. The sprocket wheels 59 carry conveyor chains 62 which run up over idling sprockets 63 carried by suitable supporting hangers 64. From the sprockets 63 the chains 62 run in a horizontal direction to other idling sprockets 65 carried by suitable supporting hangers 66. From the sprockets 65 the chains run in a downwardly direction over the idling sprockets 67 carried by the supporting hangers 68 onto the sprockets 59. The shaft 60 is connected by suitable gears 60' with another shaft 69, which is adapted to be driven by power applied to the sprocket 69'. The shaft 69, mounted in supports 61', carries sprockets 70 over which conveyor chain 71 is adapted to run. The chain 71 runs from the sprockets 70 onto idling sprockets at some other location, not shown.

Alternate links of the chain 71 comprise members extending the full width thereof, which are adapted to receive the trays T, to be conveyed from a point of loading to the point of discharge to the conveyor chains 62. The chain 71 is provided at spaced intervals with members 77, the function of which is to so space the trays T on the conveyor chain 71 that they will be picked up by the members 72 carried by the chains 62.

In order to relieve the strain on the conveyor chain 71 when it is loaded with the trays T, a skid or support 78 is provided, over which the upper horizontal portion of the chain 71 is adapted to run. The chain 71 may be provided with rollers or other means to reduce any friction between the chain and the skid or support 78. Since there is no load on the lower horizontal position of the chain 71 other than its own weight, no supporting means is necessary. The relation of the parts constituting the conveying and elevating means can be better understood when the showing of Fig. 8 is considered together with Fig. 7.

The conveyor chain is adapted to receive trays similar to those previously described and loaded with material to be treated. The chain 71 conveys these loaded trays to a point where they may be picked up by suitable receiving members 72, carried by the chains 62. Figs. 9 and 10 show a somewhat detailed view of the members 72 and the manner in which they are carried by the chains 62.

The receiving members 72 are so spaced on the chains 62, and the chains 62 are run at such a speed relative to the chain 71 as to be exactly timed therewith to pick up the trays spaced on the conveyor chain 71. The trays are carried up by the chains 62 and are lowered onto the car 36 in stack formation.

Sprockets 67 are spread apart a greater distance than any other pair of sprockets so that as a tray is deposited on a stack of trays on car 36 and the members 72 become disengaged with the lugs 55, the chains will spread apart to permit the members 72 to clear the lugs 55 on the trays below. The flanged ends of lugs 55 retain the same within members 72 until the tray is deposited on the stack. If desired guide rollers may be placed on the chains between sprockets 65 and 67 to cause the trays to be properly deposited on the stack and to permit the members 72 to pass the trays previously stacked.

The car 36 is provided with a plurality of lugs 74 adapted to engage with a member 75 operatively connected to a lever 73. When the member 75 is in engagement with one of the lugs 74 the car 36 is securely locked against movement on the track 37. The lugs 74 are spaced on the car at a distance slightly greater than the length of the side of the trays on which the handling lugs 55 are mounted. By so spacing the lugs 74 the trays may be stacked on the car 36 in a predetermined relation. After a sufficiently high stack has been built up at a point on the car, the lever 73 is moved and the car is run along until the next lug 74 engages with the member 75 operated by the lever 73. As the stacks are built up the car is moved along and stopped at intervals regulated by the lugs 74 until the car is completely loaded. After the car is completely loaded it is switched onto one of the tracks 39 and run into one of the autoclaves 2, wherein the contents of the trays are subjected to the treatment contemplated.

A modified form of loading device is shown in Fig. 11. This device comprises a cable or bar 79 which serves as a track, on which a grooved wheel 80 runs. The wheel 80 carries, by means of a shaft, a block 81 which in turn supports a shaft carrying the pulley 82. A cable 83 runs over the pulley 82 and is adapted to carry a hook 84 suitable for engaging the lugs of a tray T. The cable 79 is placed relative to the track 37 so that a tray T may be picked up by the hook 84, and the block 81 carrying the cable 83 and tray may be run to a point over the car 36 and the tray stacked thereon.

This device provides a simple means for loading the trays on the cars to be sent into the autoclaves, and is especially advantageous for use in temporary installations.

A device similar to that shown in Fig. 11 can be advantageously utilized for dumping the contents of the trays or baskets after treatment. With such an installation the trays are picked from the conveyor carrying them from the autoclaves, and are conveyed to the desired location such as over a suitable hopper, by means of an arrangement such as shown in Fig. 11. The tray or basket T may then be easily tipped to discharge its contents, while held in the hook 84.

The empty trays or baskets T may be returned to the charging floor in any desired manner. A simple and relatively inexpensive means for effecting the return of the baskets is a roller conveyor. As the stacking legs of the trays are on the top rather than the bottom the trays will slide over a roller conveyor with little hindrance.

A modified form of my invention is shown in

Figures 12, 13, 14:
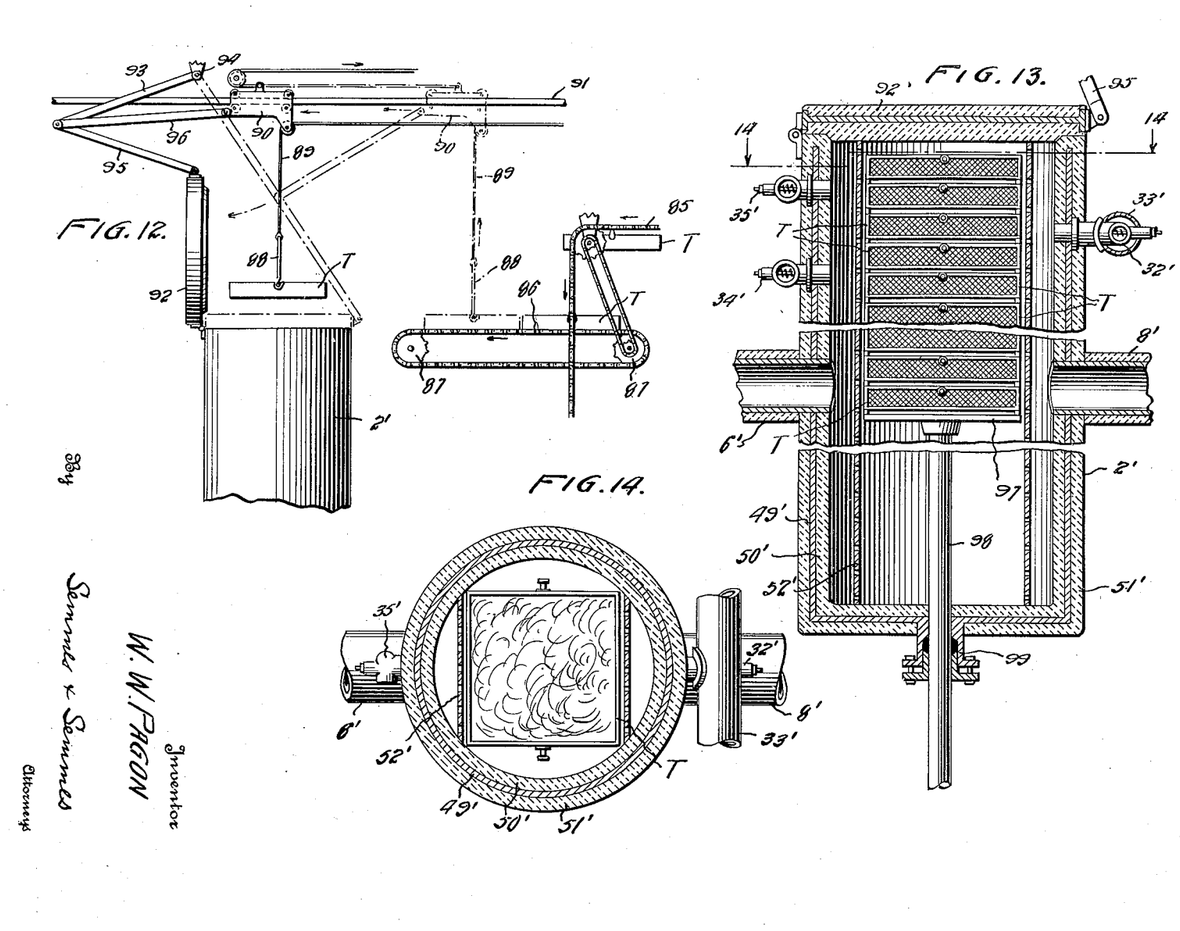
Fig. 12 is a diagrammatic illustration of a modified form of treating apparatus.
Fig. 13 is an enlarged detail of the treating element or autoclave shown in Fig. 12.
Fig. 14 is a top section taken on line 14—14 of Fig. 13.

Fig. 12, in which an autoclave 2' is shown, together with a suitable loading mechanism. In this modified form, trays T containing the material to be treated are conveyed by suitable conveying chains 85 carried by suitable sprockets onto a conveyor belt 86 carried by sprockets 87, which are suitably supported, or onto a roller or other type of conveyor. The conveyor chains 85 are similar to those shown in Figs. 7 to 10, and are indirectly connected with the conveyor belt 86 so that the trays carried by the chains 85 will be placed on the belt 86 at regular predetermined intervals. The chains 85 are provided with suitable receiving means, similar to those described and shown in Figs. 7 to 10, adapted to engage with the lugs 55 on the trays T.

The trays T are picked up from the conveyor 86 by means of a hook 88 connected to a suitable cable 89. The cable 89 is run over a pulley supported by a carriage 90 adapted to run on the track 91. The track 91 is so placed with relation to the autoclave 2' that a tray carried by the hook 88 and the cable 89, can be run directly over the autoclave 2' and loaded therein. The autoclave 2' is provided with a suitable door or cover 92 which is connected through suitable linkage with the carriage 90. A link 93 is pivoted at a support 94 and is pivotally connected with one end of a link 95 and one end of a link 96. The other end of the link 95 is connected to the door 92 of the autoclave 2' and the other end of the link 96 is pivotally connected to the carriage 90.

The door 92, as shown in full lines of Fig. 12, is in an open position, and as shown in dotted lines of Fig. 12, is in a closed position. The linkage so connects the carriage 90 with the door 92 that when a tray is loaded onto the carriage 90 and run on the cable 91 over the autoclave 2', the door 92 will be automatically opened. Likewise, after the tray is deposited into the autoclave 2' and the carriage is run back on the cable 91 to pick up another tray from the belt conveyor 86, the door 92 will be automatically closed. With such an arrangement, it can be seen that the door of the autoclave 2' is opened only when a tray is to be loaded therein, thereby excluding the atmosphere as much as possible.

The modified form of autoclave 2' is shown in an enlarged sectional view in Fig. 13. This autoclave is constructed of material similar to that used in the construction of the autoclave 2 shown in Figs. 2 and 3: that is, it is provided with a shell 49' of steel or other suitable material which is lined with an insulating material 50'. To prevent the flow of heat from the interior of said shell to the atmosphere, the shell 49' is covered with a suitable heat insulating material 51'.

The autoclave 2' is provided with a suitable blow-off valve 32' similar to that indicated at 32 as applied to the autoclave 2 previously described. The blow-off 32' is connected with a conduit 33' which in turn communicates with an absorption tower similar to tower 23, the purpose of which has been previously described. This form of autoclave is also provided with a vacuum relief valve 34' and a pressure relief valve 35' so that a predetermined pressure can be maintained within the autoclave.

Suitable conduits 6' and 8' connect the autoclave 2' in circuit with means for supplying heat and means for circulating a fluid similar to those described in connection with Fig. 1. A plurality of perforated baffles 52' are arranged vertically within the autoclave 2' on the sides, adjacent the inlet conduit 6', and adjacent the outlet conduit.

The purpose of this baffle is to evenly distribute the treating fluid over the trays containing the material to be treated when it is conducted through the autoclave under pressure. The autoclave shown in Fig. 13 differs from that shown in Fig. 2 essentially in that it is arranged vertically, whereas that shown in Fig. 2 is arranged horizontally.

It is obvious that with such an arrangement, a modified means of loading must be provided. A platform 97 is carried by a shaft 98 which extends through a packing gland 99 in the lower portion of the autoclave 2'. The lower portion of the shaft 98 is connected with suitable elevating means, so that the platform 97 can be raised or lowered as desired. As the trays T are picked from the conveyor 86 and are lowered onto the platform 97, the platform is gradually lowered until the autoclave is completely filled. If, however, the autoclave is not completely filled, the material that is within the trays loaded onto the platform 97 can be maintained in the upper portion of the autoclave. This permits the material in the trays to be better treated, as the heated fluid tends to flow to the upper portion of the container.

The elevating platform 97 also provides a means of easy removal of the trays from the autoclave. Thus, when it is desired to remove the trays from the autoclave, the platform 97 can be elevated to any desired height, thereby eliminating the necessity of one entering into the autoclave to fasten the hook onto the lugs 55.

The form of my invention just described is particularly desirable when the treating plant is to be located where there is a small amount of ground space available, or in a building arranged for vertical flow movement rather than horizontal movement thereof.

Figure 16:
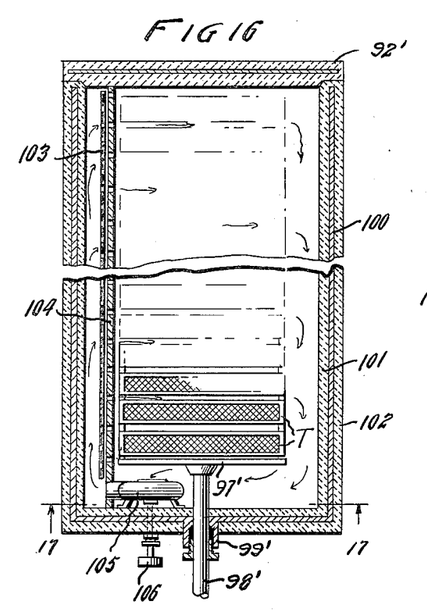
Fig. 16 is a modified form of autoclave constituting a part of my invention.
Figure 17:
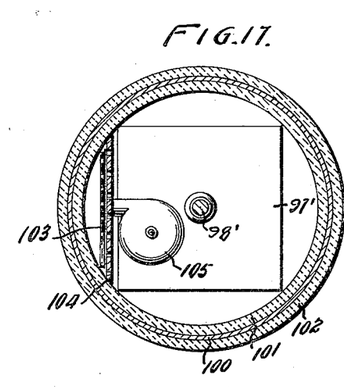
Fig. 17 is a horizontal sectional view taken on line 17—17 of Fig. 16.

Still another modification of my invention is shown in Fig. 16, in which a vertically arranged cylindrical casing 100, of steel or other material of suitable strength, is provided, forming an autoclave. The cylindrical casing 100 is lined with insulating material 101 and is covered with a heat insulating material 102 for preventing the flow of heat from the interior of the casing to the atmosphere.

This form of my invention is somewhat similar to that shown in Figs. 12 to 14 in that the material to be treated is loaded in the autoclave through the upper portion thereof. The autoclave is provided with a suitable door or cover 92' and is also provided with a platform 97' carried by a shaft 98'. The shaft 98' passes through a packing gland 99' and is connected to a suitable elevating mechanism, not shown. The platform 97' operates in the same manner as the platform 97 as shown in Fig. 13. This form of my invention differs essentially from those previously described in that there is no communication provided from within the autoclave to the atmosphere or to any other device.

In order to provide for the heating of this autoclave, a multiplicity of electrical heating elements 103 are mounted therein. A perforated baffle 104 is vertically arranged within the casing adjacent one side thereof. A fan or blower 105, adapted to be driven by a suitable means 106, is so arranged in the lower portion of the autoclave as to create a circulation from one side of the perforated baffle 104 to the other side thereof, through the perforations in the baffle over the material to be treated, and back to the fan or blower 105. The perforated baffle 104 in this case acts to distribute the fluid circulated by the pump 105 throughout the material to be treated. The flow of fluid is indicated by arrows shown in Fig. 16.

In this form of my invention, the material to be treated is placed within the autoclave and the cover 92' is sealed thereon, after which the blower 105 is placed in operation and the current supplied to the heating element 103. The fluid is circulated upwardly from the pump over the heating unit 103 through the perforations of the distributing baffle 104, through the material to be treated, and thence downwardly to the inlet of the pump 105. Of course, suitable vacuum relief and pressure relief valves may be provided if necessary as in the forms of autoclaves already described.

Figures 18, 19:
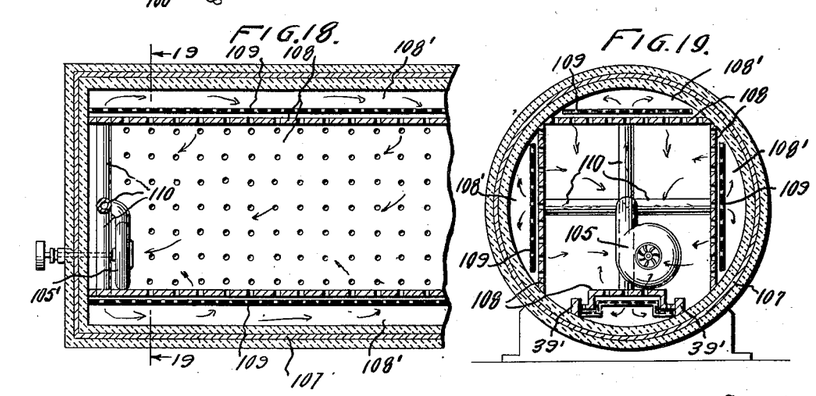
Fig. 18 is another modified form of autoclave constituting a part of my invention.
Fig. 19 is a vertical sectional view taken on line 19—19 of Fig. 18.

Another form of my invention, the operation of which is somewhat similar to that shown in Fig. 16, is illustrated in Figs. 18 and 19. In this form the casing of the autoclave is arranged horizontally and is provided with suitable tracks 39' on which a car carrying the material to be treated may be run. Adjacent the closed end of this autoclave there is provide a suitable pump or blower 105', similar to that used in the form of my invention shown in Fig. 16. The upper, lower and side portions of the cylindrical autoclave 107 are provided with suitable perforated baffles 108, the purpose of which is to distribute the flow of the fluid being circulated through the autoclave by means of the pump 105'. The baffles 108 are so arranged in the cylindrical autoclave as to provide spaces 108' between the walls of the autoclave and the baffles 108.

Between the walls of the autoclave and the baffles 108 in the spaces 108' suitable electrical heating units 109 are placed in such position as to heat fluid flowing through the baffles.

In operation, a car loaded with trays of material to be treated is run on the track 39 into the autoclave. The door of the autoclave, not shown in this form, is then closed, thereby sealing the interior from the atmosphere. The pump 105' is then put into operation, which creates a circulation of the fluid from within the central portion of the autoclave through the pump 105', through the conduits 110, and into the chambers 108' provided between the walls of the autoclave and the baffles 108. The fluid flows over the electrical heating units 109, thence through the perforations in the baffles 108, and is distributed evenly over the material in the trays loaded in the car. The fluid flows through the material and thence back to the pump 105' for recirculation.

In this form of my invention, the casing of the autoclave is formed of material similar to that described in connection with the other autoclave constituting my invention and may be provided with suitable vacuum and pressure relief valves if desired.

Figure 20:
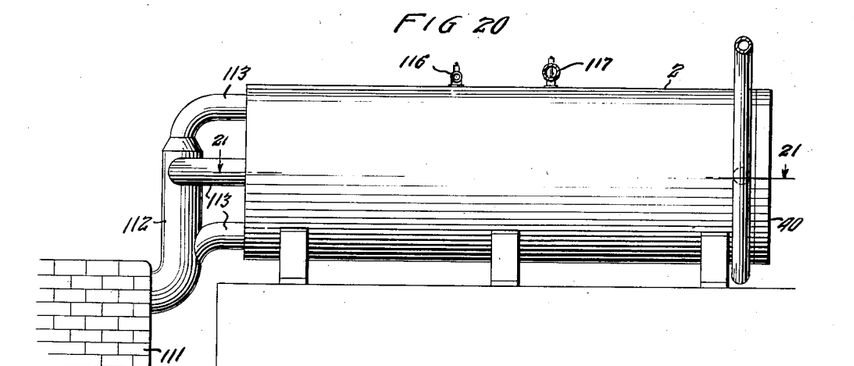
Fig. 20 is another modified form of autoclave constituting a part of my invention.
Figure 21:
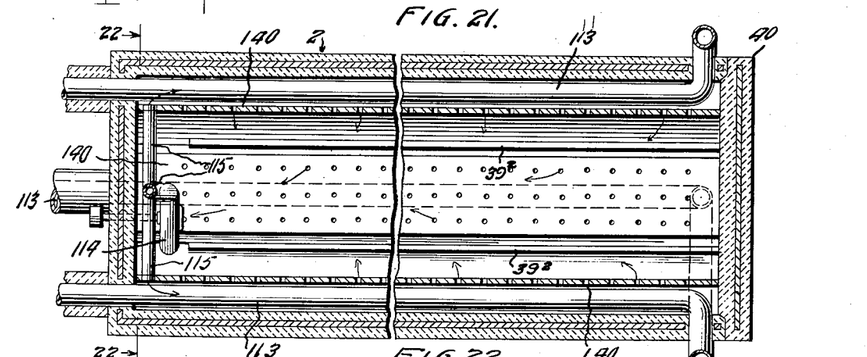
Fig. 21 is a horizontal sectional view taken on line 21—21 of Fig. 20.
Figure 22:
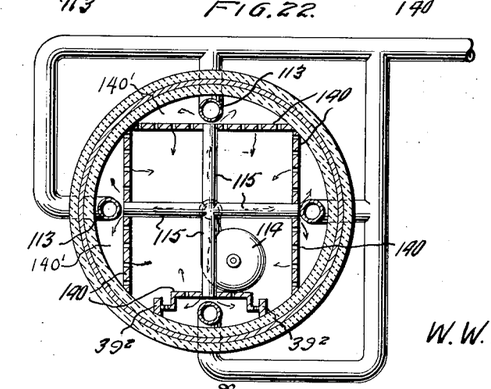
Fig. 22 is a vertical sectional view taken on line 22—22 of Fig. 21.

Another form of my invention, somewhat similar to that shown in Figs. 18 and 19, is illustrated in Figs. 20, 21 and 22. This form of my invention differs from that described in Figs. 18 and 19 in that a different source of heat is provided. The construction of the casing of the autoclave shown in this form of my invention, together with the baffle arrangement and the circulating means, is identically the same as that described in connection with Figs. 18 and 19.

In this form of my invention a furnace or other source of heat 111 is connected by a suitable duct 112 with conduits 113. The conduits 113, as shown in Figs. 21 and 22, pass through a space 140' within the autoclave formed between the walls thereof and the perforated baffles 140.

In operation of this form of my invention, the material to be treated is placed on the car and run into the autoclave on the track 39². Then the cover of the autoclave is sealed in place, and the products of combustion from the furnace 111 are conveyed up through the manifold 112 into the conduits 113 to a point of discharge. The pump 114 is then put into operation, thus causing the circulation of fluid from within the central portion of the autoclave through the pump 114, through the conduits 115, into the spaces 140' provided between the casing of the autoclave and baffles 140 over the conduits 113, by which it is heated. The fluid thus heated then flows through the apertures in the baffles 140 into the central portion of the autoclave over the material to be treated and thence back to the pump 114 for recirculation.

This form of my invention is provided with suitable vacuum relief means 116 and pressure relief means 117 in order that predetermined pressures may be maintained.

With some materials to be treated it is necessary to provide agitation while the material is being processed. My invention also contemplates an apparatus capable of carrying out such a process in which agitation is necessary. Such form of my invention is shown in Figs. 23 and 24.

Figure 23:
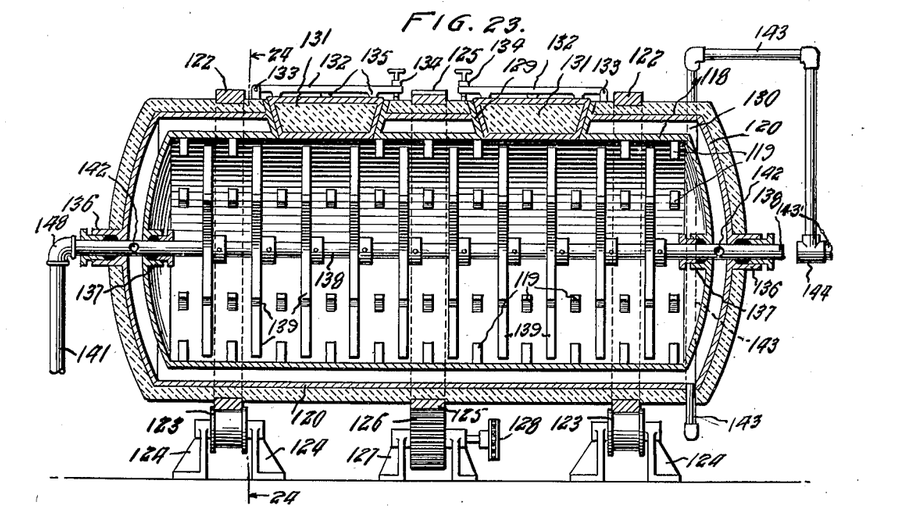
Fig. 23 is a sectional view of another modified form of autoclave constituting a part of my invention.
Figure 24:
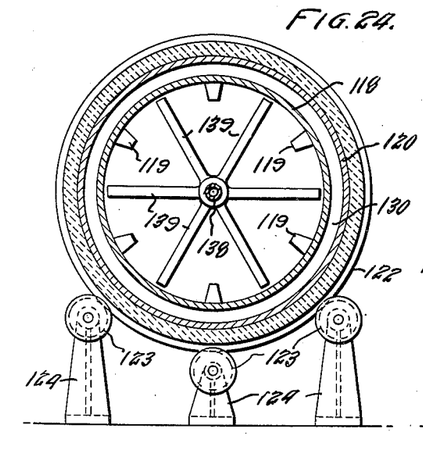
Fig. 24 is a vertical sectional view taken on line 24—24 of Fig. 23.

The modification of my invention shown in Fig. 23 comprises an autoclave formed of a cylindrical member 118 provided on the interior surface thereof with a plurality of projections 119. Surrounding the cylinder 118 in spaced relation therefrom is another cylinder 120. Cylinder 120 is covered with heat insulating material 121 to prevent the flow of heat from the interior of the cylinder 120 to the atmosphere.

The outer cylinder or casing is surrounded by two annular bands 122 which are adapted to cooperate with flanged rollers 123 carried by suitable supports 124 to permit rotation of the casing. A band 125, somewhat similar to the bands 122 but provided with gear teeth, extends around the central portion of the casing. A pinion 126 mounted on a shaft carried by supports 127 and adapted to be rotated by a sprocket wheel 128 to which suitable power is applied, is adapted to mesh with the gear teeth of the band 125. When the pinion 126 is rotated it will impart rotation to the band 125, thereby causing the casings constituting the autoclave to rotate.

The autoclave is provided with a plurality of manholes extending through the outer and inner cylinders 120 and 118 to permit access to the interior of the latter. In order to provide for the proper fitting of a cover, the edges of the material surrounding the opening are faced with material 129 similar to that of which the cylinders are constructed. To prevent leakage from within the space 130 between the cylinders and from the interior of the cylinder 118 to the atmosphere, the material 129 is bonded or otherwise joined to the material of the cylinders 118 and 120. It will be noted that the opening in the outer cylinder is larger than that in the inner cylinder in order to provide a tapered seat for the cover 131.

As shown in Fig. 23, the covers for the manholes are formed to fit within the tapering openings provided therefor in such a manner as to effectively seal the interior of the autoclave from the atmosphere. In order to minimize the heat leak through the covers 131 they are made in the form of a shell, the interior of which is packed with heat insulating material.

Securing members 132 hingedly connected to the outer casing of the autoclave at 133 are provided to retain the covers 131 in the manholes under all conditions arising during the operation of the autoclave. By referring to Fig. 23 it can be seen that the securing means 132 are provided with projections 135 adapted to bear on the outer surface of the covers, thus insuring an evenly distributed pressure thereon.

Packing glands 136 and 137 are provided in the central portion of the ends of the cylinders 120 and 118, respectively. Passing through the packing glands 136 and 137, and extending axially through the autoclave is a conduit member 138. Mounted on the member 138 in spaced relation is a plurality of spiders 139 which cooperate with the projections 119 on the interior of the autoclave to agitate any material therein. As shown in Fig. 23, the spiders 139 may be stationary, or rotated in any direction desired, and the autoclave carrying the projections 119 is adapted to rotate. I wish it to be understood, however, that my invention includes alternate methods of agitation, such as rotating the spiders and maintaining the autoclave stationary.

The space 130 between the cylinders 118 and 120 serves as a jacket through which a temperature modifying medium may be circulated. A conduit 141 is connected to the shaft member 138 and is adapted to conduct a temperature modifying fluid thereto. The connection between conduits 138 and 141 through the elbow 148 is such as to permit rotation of the conduit 138 relative to conduit 141 without the occurrence of any leakage. The shaft member 138 is provided with openings 142 through which the temperature modifying fluid is adapted to flow into the jacket space 130.

The conduit member 138 is provided with a plug or other suitable means for preventing the escape of fluid. If desired, the shaft member 138 can be formed of solid material provided with suitable ducts for the flow of fluid.

If steam is used as the temperature modifying fluid, it is necessary to provide a means for the escape of the condensate. A conduit 143 is connected with the jacket 130 through the outer shell through which the condensate flows to a point of discharge. In order to effectively drain the condensate from the jacket 130, the conduit 143 is extended partially around the autoclave through an arc of 180° before it is connected with the conduit 138. A connecting member 144 is supported in such a manner as to permit relative motion between conduits 143 and 143' and yet establish communication therebetween.

In operation, condensate in jacket 130 will run into conduit 143 when in the position shown in Fig. 23. As the autoclave and conduit 143 are rotated the condensate, tending to seek the lowest elevation, will be conducted through the conduit 143 to the point where the latter connects with the conduit 143' and will flow thereinto and therethrough to a point of discharge. A trap, or other means, not shown, may be connected with the outlet, if desired, to maintain a pressure in the jacket 130. If found necessary, suitable check valves may be placed in conduit 143 to prevent the return of condensate to the autoclave.

Figure 25:
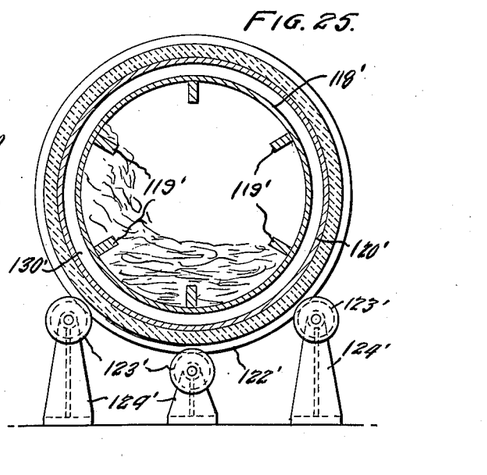
Fig. 25 is a view similar to Fig. 24 of a modification of the device shown in Fig. 23.

A cross sectional view of a modified form of rotating autoclave is shown in Fig. 25. This form differs from the autoclave just described in that the central agitating mechanism is omitted. Large tumbling projections are arranged around the interior wall of the autoclave in such a manner that as the autoclave is rotating any material therein is thoroughly agitated. The mounting, rotating and heating means are of the same construction as for the rotating autoclave previously described, similar parts being indicated by similar reference numerals, those used in the latter modification being primed.

In assembling the parts of the autoclaves embodying the various forms of my invention, it is desirable to reduce the heat leak to a minimum. This may be accomplished by insulating the baffles, track and other internally exposed parts from the shell, and by covering the conduits exposed to the atmosphere with suitable heat insulating material to prevent loss by radiation and conduction.

In carrying out the process of converting nitrogenous material into a form available for use as a fertilizer, the material to be treated is chopped and graded and then subjected to drying and humidifying treatments to so condition it for best conversion results. The apparatus for carrying out the preliminary treatments may be of the type commonly used for such purposes and may be housed in rooms or chambers of any desired type. After this preliminary treatment the material is placed in trays T, of either of the forms described and shown in Figs. 4 and 6. The trays T are then loaded onto an endless belt conveyor to be carried to the point from which they are placed in the autoclaves.

When the trays are to be placed in an autoclave of the horizontal type, the loading mechanism shown in Fig. 7 is used. The trays are placed on the belt conveyor 71 at spaced intervals, and are carried to a point at which the trays T are picked from the conveyor 71 by the members 72 carried by chains 62. The chains 62 carry the trays T upwardly and then downwardly in such a manner as to place them in stocks on a car 36, as shown in Fig. 7. The car 36 is provided with a member 74 adapted to cooperate with a locking device 75 to retain the car at predetermined points on the track 37.

After trays are stacked to a sufficient height at one point on the car 36, the latter is moved to a position determined by the members 74 and 75, so that another stack of trays can be made. The car 36 is moved from time to time until the car 36 is completely loaded, or is loaded to the extent desired. The car with its load is then switched onto one of the tracks 39, shown in Fig. 1, and is run into one of the autoclaves 2 for treatment.

After the car loaded with material to be treated is run into one of the autoclaves 2, the closure 40 is shut and secured in position, and the treatment may be started. The valves 6' in conduit 6 leading to the packed autoclave are opened, placing the same in the circuit to be heated. Air or other gases arising from the material undergoing treatment are heated in furnace 1 and are conducted to the autoclave to heat the contents therein. As the autoclave is sealed to the atmosphere, a pressure is generated therein which accelerates the treatment of the material. The hot fluid entering through conduit 6 passes through the baffle member 52 which distributes the fluid evenly over the material in the trays T.

The fluid normally leaves the autoclave through outlet conduit 8 connected with duct 9, and is circulated by the pump 12 through either the condenser 16 or the furnace 1, or partly through both. The fluid flowing through the condenser 16 is cooled, thereby removing any condensible constituents therefrom. The condensed portion is collected and the volatile portion is conducted back through the autoclaves. Furnace 1 heats the fluid flowing therethrough to the temperature desired for the treatment.

As before mentioned, furnace 1 is thermostatically controlled and may be operated to produce any temperature desired.

In the course of treatment some of the volatile matter evolved may be passed directly through conduit 30 or indirectly through vacuum pump 21 to the absorption column 23, wherein the material capable of absorption can be separated from the air. To prevent the escape of any condensible matter the fluid leaving the absorption column 23 is passed through condenser 28.

Blow-off valves 32 are connected with conduit 33 which is adapted to conduct any material blown off by excessive pressure in the autoclave, to the absorption column 23. The vacuum relief and pressure relief valves operate to maintain the pressure in the autoclave, desired for the treatment, the pressure relief valve opening only when the blow-off valve fails to operate.

The autoclave shown in Figs. 12 to 14 differ from the horizontal type merely in the positioning thereof and the modified loading mechanism. As shown in Fig. 12, trays T packed with material to be treated, are loaded on conveyor 85 which conveys the trays T to the conveyor 86. The carriage 30 is operatively connected with the cover 92 of the autoclave so that when the carriage 90 carrying a tray, picked from conveyor 86 by member 88, is moved over the autoclave, the door or cover 92 automatically opens, and when the carriage moves away, the door closes.

As the trays are placed in the autoclave on the platform 97, the latter lowers, making room for the next tray until the autoclave is completely loaded. In unloading the autoclave of this type the platform 97 may be raised, thus eliminating the necessity of going into or reaching in the autoclave to remove the trays T.

The treatment of the material in the autoclave is identical with that described in connection with the horizontal autoclave shown in Fig. 1.

In the autoclaves shown in Figures 16 to 22 there is no communication between the interior of the same with any other device, but the fluid evolved during heating is circulated through the sealed autoclave. In the form shown in Fig. 16, fluid is circulated by the pump 105 over an electric heating element 103, and thence through a distributing baffle 104 over the material being treated. The fluid, after passing over the material, is withdrawn from the treating chamber back to the pump for recirculation.

The form of my invention shown in Figs. 18 and 19 operates essentially the same as does the modification just described, except that the autoclave is horizontally mounted. This form, as in the case of the vertical form, is electrically heated and the fluid flows over the electrical heating units 109 to be heated thereby.

It is possible to utilize steam or other heating media to heat the fluid circulating in the autoclave instead of electricity. An autoclave constructed so as to be heated by a hot fluid is shown in Figs. 20 to 22. In this particular modification, the heating of the fluid circulating in the autoclave is effected by hot products of combustion from furnace 111 flowing through conduits 113, over which the fluid circulates prior to passing through the perforated baffles. The circulating of the fluid in this apparatus is identical with that of the structure shown in Figs. 18 and 19. This form of my invention is particularly desirable for use in plants wherein hot products of combustion are available, as the heat necessary for carrying out the process can thereby be obtained at a minimum cost.

When it is found desirable to agitate the material undergoing treatment, the process can be carried out in the apparatus shown in Figs. 23 to 25. Material to be treated is introduced into the autoclave through the manholes provided with covers 131, which are secured in position to prevent any leakage. The whole autoclave is rotated in such a manner as to cause material therein to be agitated by the projections 119. To insure more perfect agitation, spiders 139 mounted on shaft 138 may be rotated or may be held stationary. The spiders 139 in some cases may not be necessary and may be dispensed with, as shown in Fig. 25. A suitable heating medium, such as steam, is introduced into the jacket surrounding the autoclave to heat the contents to the temperature desired, and effect the conversion thereof.

The apparatus constituting my invention makes conversion of nitrogenous material into forms suitable for use as fertilizers possible under many different operating conditions and plant locations. My apparatus can be utilized to bring about the conversion, using all of the commonly employed heating media, thus making the equipment necessary adaptable for economical use in all localities. Also the many modifications shown and described make it possible to bring about a pyrogenic conversion of unavailable nitrogenous material to a form available for use as a fertilizer, without local overheating of any part of the material, or insufficient heating of any portion thereof.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. A system for converting nitrogenous material into a form suitable for use as a fertilizer, comprising a battery of autoclaves, a heat exchanger, conduit means for cyclically connecting said autoclaves with the heat exchanger, and means for cyclically circulating a treating fluid through said autoclaves and said heat exchanger.

2. An apparatus for converting nitrogenous material into a form suitable for use as a fertilizer, comprising an autoclave, a heat exchange device and a condenser, means for cyclically circulating a treating fluid through said autoclave and said heat exchange device and means for by-passing a portion of the treating fluid about the heat exchanger and passing it through said condenser.

3. An autoclave system comprising a plurality of autoclaves, a heat exchange device, a condenser and an absorption tower, means for cyclically circulating a treating fluid through said autoclave and said heat exchange device, means operable at will for cutting out said heat exchanger and for circulating said treating fluid through said autoclaves and said condenser and means for withdrawing a portion of said circulating treating fluid and discharging it through said absorption tower.

4. An autoclave system comprising a battery of autoclaves, an absorption tower, means for injecting a treating fluid into said autoclaves under pressure, means for withdrawing a portion of said treating fluid from said autoclaves and passing the same through the absorption tower.

5. An autoclave system comprising a battery of autoclaves, means for injecting a treating fluid into said autoclaves under pressure, means for withdrawing a portion of said treating fluid from said autoclaves and passing the same through an absorption tower, and means for blowing off a portion of said treating fluid through said absorption tower when a predetermined pressure is reached within said autoclaves.

6. An apparatus for converting material comprising an autoclave, conduits cyclically connecting said autoclave with a heating device, conduits cyclically connecting said autoclave with a condenser, means interposed between the autoclave and heating device for withdrawing fluid from the autoclave, the exhaust from said withdrawing means being in communication with said heating device and said condenser and valve means for selectively passing the withdrawn fluid through said heating means or said condenser back into said autoclave.

7. An apparatus for converting material comprising an autoclave, conduits cyclically connecting said autoclave with a heating device, conduits cyclically connecting said autoclave with a condenser, means interposed between the autoclave and heating device for withdrawing fluid from the autoclave, the exhaust from said withdrawing means being in communication with said heating device and said condenser and valve means for selectively passing the withdrawn fluid through said heating means or said condenser back into said autoclave, an absorption tower associated with said apparatus, and means for forcing a portion of said fluid through said absorption tower.

8. An apparatus for converting material comprising an autoclave, conduits cyclically connecting said autoclave with a heating device, conduits cyclically connecting said autoclave with a condenser, means interposed between the autoclave and heating device for withdrawing fluid from the autoclave, the exhaust from said withdrawing means being in communication with said heating device and said condenser and valve means for selectively passing the withdrawn fluid through said heating means or said condenser back into said autoclave, an absorption tower and a second condenser, and means for forcing a portion of said fluid serially through said absorption tower and said second condenser.

9. An apparatus for converting material comprising an autoclave, conduits cyclically connecting said autoclave with a heating device, conduits cyclically connecting said autoclave with a condenser, means for withdrawing fluid from the autoclave, the exhaust from said withdrawing means being in communication with said heating device and said condenser, valve means for selectively passing the withdrawn fluid through said heating means or said condenser back into said autoclave, an absorption tower and a second condenser, means for forcing a portion of said fluid serially through said absorption tower and said second condenser, a conduit connecting said absorption tower with said autoclave, and pressure responsive means in said conduit for placing the interior of the autoclave in communication with the absorption tower when a predetermined pressure is reached in said autoclave.

10. An apparatus for treating material comprising a plurality of autoclaves, a heating device, conduits cyclically connecting said heating device with said autoclaves, means for withdrawing fluid from said autoclaves and forcing the same through said heating device back into said autoclaves, means for bypassing fluid about said heating device, a condenser in said bypass, an absorption tower, and means for withdrawing fluid from said autoclaves for forcing the same through said absorption tower.

11. An apparatus for treating material comprising a plurality of autoclaves, a heating device, conduits cyclically connecting said heating device with said autoclaves, means for withdrawing fluid from said autoclaves and forcing the same through said heating device back into said autoclaves, means for bypassing fluid about said heating device, a condenser in said bypass, an absorption tower and a second condenser, means for withdrawing fluid from said autoclaves and forcing the same serially through said absorption tower and said second condenser.

WILLIAM WATTERS PAGON.